(12) United States Patent
Ippatapu et al.

(10) Patent No.: US 11,687,243 B2
(45) Date of Patent: Jun. 27, 2023

(54) DATA DEDUPLICATION LATENCY REDUCTION

(71) Applicant: EMC IP Holding Company LLC, Hopkinton, MA (US)

(72) Inventors: Venkata Ippatapu, Westborough, MA (US); Ramesh Doddaiah, Westborough, MA (US); Sweetesh Singh, Benares (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 35 days.

(21) Appl. No.: 17/382,447

(22) Filed: Jul. 22, 2021

(65) Prior Publication Data

US 2023/0027284 A1    Jan. 26, 2023

(51) Int. Cl.
*G06F 3/06* (2006.01)
*G06F 12/06* (2006.01)

(52) U.S. Cl.
CPC .............. *G06F 3/061* (2013.01); *G06F 3/067* (2013.01); *G06F 3/0655* (2013.01); *G06F 3/0679* (2013.01); *G06F 12/0692* (2013.01)

(58) Field of Classification Search
None
See application file for complete search history.

(56) References Cited

U.S. PATENT DOCUMENTS

| | | | |
|---|---|---|---|
| 6,226,671 B1 * | 5/2001 | Hagersten | G06F 12/0284 709/215 |
| 10,678,778 B1 * | 6/2020 | Chalmer | G06F 16/9535 |
| 2010/0228701 A1 * | 9/2010 | Harris, III | H04L 51/212 711/216 |

* cited by examiner

*Primary Examiner* — Jane W Benner
(74) *Attorney, Agent, or Firm* — Krishnendu Gupta; Nikhil Patel

(57) ABSTRACT

Aspects of the present disclosure relate to reducing the latency of data deduplication. In embodiments, an input/output (IO) workload received by a storage array is monitored. Further, at least one IO write operation in the IO workload is identified. A space-efficient probabilistic data structure is used to determine if a director board is associated with the IO write. Additionally, the IO write operation is processed based on the determination.

16 Claims, 4 Drawing Sheets

DATA DEDUPLICATION LATENCY REDUCTION

BACKGROUND

A storage array is a data storage system for block-based storage, file-based storage, or object storage. Rather than store data on a server, storage arrays use multiple drives in a collection capable of storing a vast amount of data. Storage arrays can include a central management system that manages the data. In addition, storage arrays can establish data dedupe techniques to maximize the capacity of their storage drives. Data deduplication techniques eliminate redundant data in a data set. The methods can include identifying copies of the same data and deleting the data copies such that only one copy remains.

SUMMARY

Aspects of the present disclosure relate to reducing the latency of data deduplication. In embodiments, an input/output (IO) workload received by a storage array is monitored. Further, at least one IO write operation in the IO workload is identified. A space-efficient probabilistic data structure is used to determine if a director board is associated with the IO write. Additionally, the IO write operation is processed based on the determination.

In embodiments, the IO write operation can be received by a first director board.

In embodiments, the first director board or a second director board remote from the first director board can be determined to be associated with the IO write operation. Further, the storage array can house the first and second director boards.

In embodiments, a portion of the storage array's global memory can be pre-allocated for each of the storage array's director boards. Each director board's pre-allocated global memory portion can be configured to store the space-efficient probabilistic data structure.

In embodiments, each director board's pre-allocated global memory portion can be uniformly provisioned from the storage array's global memory section.

In embodiments, a unique fingerprint identifier for the IO write operation can be generated.

In embodiments, hash processing can be used to generate the unique fingerprint. Further, a set of n-bits of the unique fingerprint can be selected to store in the space-efficient probabilistic data structure.

In embodiments, the hash processing can be configured to generate the unique fingerprint such that the set of n-bits of the unique fingerprint identify one of the storage array's director boards associated with the unique fingerprint's related IO write operation.

In embodiments, a space-efficient probabilistic data structure copy can be maintained on each director board.

In embodiments, one or more fingerprints generated during a prior time window can be periodically identified. Each director board's data structure copy can be updated to include each generated fingerprint's set of n-bits to maintain the space-efficient probabilistic data structure copy.

DETAILED DESCRIPTION

Storage arrays can be configured to perform data deduplication (dedupe) to eliminate duplicate copies of data. Dedupe techniques include comparing data 'chunks' (also known as 'byte patterns') which are unique, contiguous data blocks. The techniques identify the chunks by comparing them to other chunks within existing data using input/output (IO) fingerprints. Whenever a match occurs, the techniques replace the redundant chunk with a reference that points to the stored chunk. For example, arrays can receive a byte pattern frequently (e.g., dozens, hundreds, or thousands of times). A data chunk's size can define the frequency that arrays encounter the chunk's byte pattern.

A storage array can receive an IO request by a first director board of a first engine. However, due to limited memory, arrays uniformly distribute IO fingerprints across each of their engine's director boards. Accordingly, a second director board remote from the first director board (e.g., located on a different engine) can store the received IO request's corresponding fingerprint. In such circumstances, the time arrays require to identify that the second director board stores the IO request's fingerprint can introduce undesired latency. Specifically, the latency can cause the array to be incompliant with a client's performance requirements.

Embodiments of the present disclosure relate to an intelligent data dedupe controller that significantly reduces the latency associated with data dedupe, as described in greater detail herein.

Figure 1:
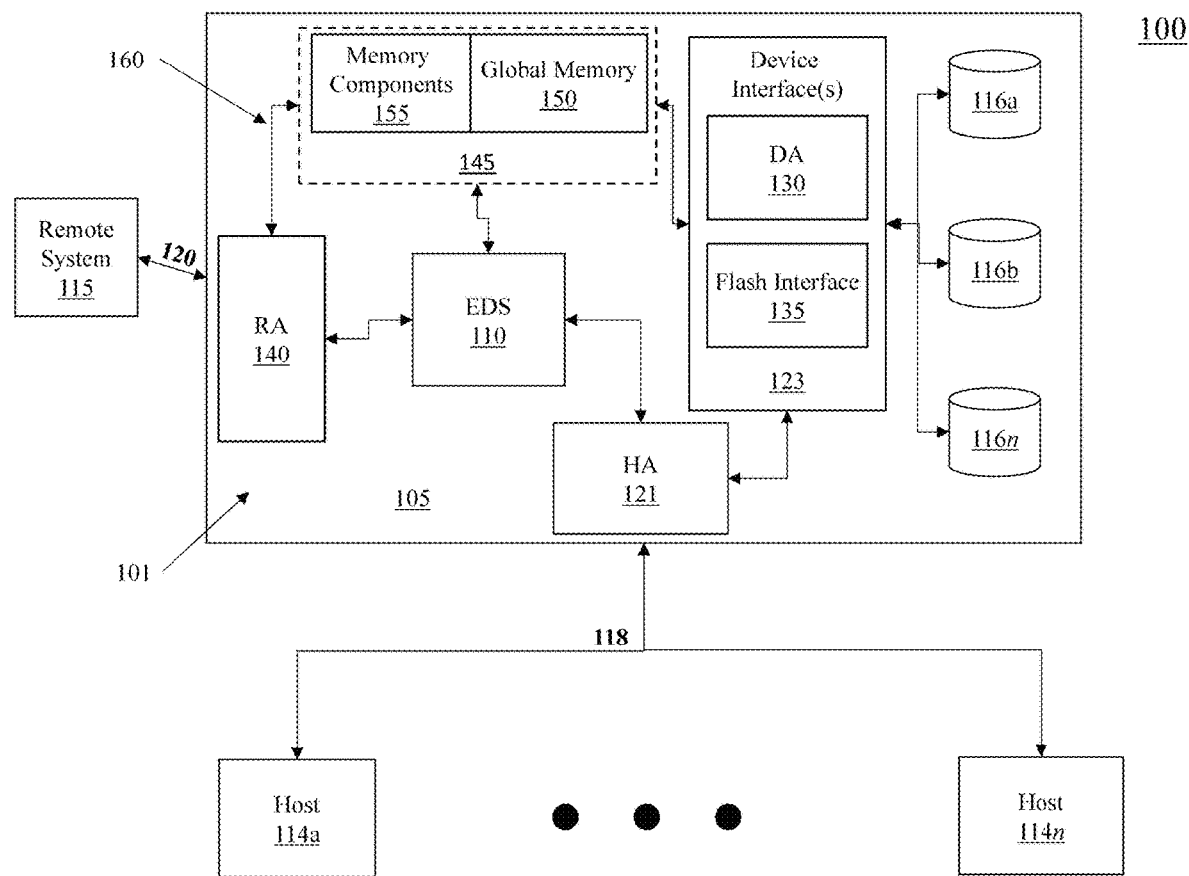
FIG. 1 is a block diagram of a storage array in accordance with embodiments of the present disclosure.

Regarding FIG. 1, a system 100 includes a storage array 105 that includes components 101 configured to perform one or more distributed file storage services. In embodiments, the array 105 can include one or more internal communication channels 160 that communicatively couple each of the array's components 101. The communication channels 160 can include Fibre channels, internal busses, or communication modules. For example, the array's global memory 150 can use the communication channels 160 to transfer data or send other communications between the array's components 101.

In embodiments, the array 105 and one or more devices can form a network. For example, a first communication network 118 can communicatively couple the array 105 to one or more host systems 114a-n. Likewise, a second communication network 120 can communicatively couple the array 105 to a remote system 115. Thus, the first and second networks 118, 120 can interconnect devices to form a network (networked devices). The network can be a wide area network (WAN) (e.g., Internet), local area network (LAN), intranet, Storage Area Network (SAN)), and the like.

In further embodiments, the array 105 and other networked devices (e.g., the hosts 114a-n and the remote system 115) can send/receive information (e.g., data) using a communications protocol. The communications protocol can include a Remote Direct Memory Access (RDMA), TCP, IP, TCP/IP protocol, SCSI, Fibre Channel, Remote Direct Memory Access (RDMA) over Converged Ethernet (ROCE) protocol, Internet Small Computer Systems Interface (iSCSI) protocol, NVMe-over-fabrics protocol (e.g., NVMe-over-ROCEv2 and NVMe-over-TCP), and the like.

The array 105, remote system 116, hosts 115a-n, and the like can connect to the first or second networks 118,120 via a wired/wireless network connection interface, bus, data link, and the like. Further, the first and second networks 118, 120 can also include communication nodes that enable the networked devices to establish communication sessions. For example, communication nodes can include switching equipment, phone lines, repeaters, multiplexers, satellites, and the like.

In embodiments, one or more of the array's components 101 can process input/output (IO) workloads. An IO workload can include one or more IO requests (e.g., operations) originating from one or more of the hosts 114a-n. The hosts 114a-n and the array 105 can be physically co-located or located remotely from one another. In embodiments, an IO request can include a read/write request. For example, an application executing on one of the hosts 114a-n can perform a read or write operation resulting in one or more data requests to the array 105. The IO workload can correspond to IO requests received by the array 105 over a time interval.

In embodiments, the array 105 and remote system 115 can include any single or multi-processor systems (e.g., an Intel-based processor and the like). Likewise, the array's components 101 (e.g., HA 121, RA 140, device interface 123, and the like) can include physical/virtual computing resources (e.g., a processor and memory) or require access to the array's resources. For example, the memory can be a local memory 145 configured to store code that the processor can execute to perform one or more storage array operations.

In embodiments, the HA 121 can be a Fibre Channel Adapter (FA) that manages communications and data requests between the array 105 and any networked device (e.g., the hosts 114a-n). For example, the HA 121 can direct one or more IOs to one or more of the array's components 101 for further storage processing. In embodiments, the HA 121 can direct an IO request to the array's device interface 123. The device interface 123 can manage the IO request's read/write data operation requiring access to the array's data storage devices 116a-n. For example, the data storage interface 123 can include a device adapter (DA) 130 (e.g., storage device controller), flash drive interface 135, and the like that controls access to the storage devices 116a-n. Likewise, the array's Enginuity Data Services (EDS) processor 110 can manage access to the array's local memory 145. In additional embodiments, the array's EDS 110 can perform one or more self-optimizing techniques (e.g., one or more machine learning techniques) to deliver performance, availability, and data integrity services for the array 105 and its components 101.

In embodiments, the array's storage devices 116a-n can include one or more data storage types, each having distinct performance capabilities. For example, the storage devices 116a-n can include a hard disk drive (HDD), solid-state drive (SSD), and the like. Likewise, the array's local memory 145 can include global memory 150 and memory components 155 (e.g., register memory, shared memory constant memory, user-defined memory, and the like). The array's memory 145 can include primary memory (e.g., memory components 155) and cache memory (e.g., global memory 150). The primary memory and cache memory can be a volatile or nonvolatile memory. Unlike nonvolatile memory, volatile memory requires power to store data. Thus, volatile memory loses its stored data if the array 105 loses power for any reason. In embodiments, the primary memory can include dynamic (RAM) and the like, while cache memory can include static RAM. Like the array's storage devices 116a-n, the array's memory 145 can have different storage performance capabilities.

In embodiments, a service level agreement (SLA) can define at least one Service Level Objective (SLO) the hosts 114a-n expect the array 105 to achieve. For example, the hosts 115a-n can include host-operated applications. The host-operated applications can generate data for the array 105 to store or read its stored data. In addition, the hosts 114a-n can assign different levels of business importance to data types they produce or require. Thus, each SLO can define a service level (SL) for each data type the hosts 114a-n write to or read from the array 105. Further, each SL can specify the host's expected storage performance requirements (e.g., a response time and uptime) for one or more data types.

Accordingly, the array's EDS 110 can establish a storage/memory hierarchy based on one or more of the SLA and the array's storage/memory performance capabilities. For example, the EDS 110 can establish the hierarchy to include one or more tiers (e.g., subsets of the array's storage/memory) with similar performance capabilities (e.g., response times and uptimes). Thus, the EDS-established fast memory/storage tiers can service host-identified critical and valuable data (e.g., Platinum, Diamond, and Gold SLs), while slow memory/storage tiers service host-identified non-critical and less valuable data (e.g., Silver and Bronze SLs).

In embodiments, the HA 121 can present the hosts 114a-n with logical representations of the array's physical storage devices 116a-n and memory 145 rather than exposing their respective physical address spaces. For example, the EDS 110 can establish at least one logical unit number (LUN) representing a slice or portion of a configured set of disks (e.g., storage devices 116a-n). The array 105 can present one or more LUNs to the hosts 114a-n. For example, each LUN can relate to at least one physical address space. Further, the array 105 can mount (e.g., group) one or more LUNs to define at least one logical storage device (e.g., logical volume (LV)).

In further embodiments, the HA 121 can receive an IO request identifying one or more of the array's storage tracks. Accordingly, the HA 121 can parse that information from the IO request to route its related data to its target storage track. In other examples, the array 105 may not have previously associated a storage track to the IO request's related data. The array's DA 130 can assign at least one storage track to service the IO request's associated data in such circumstances. In embodiments, the DA 130 can give each storage track a unique track identifier (TID). Accordingly, each TID can correspond to one or more physical storage address spaces of the array's storage devices 116a-n or global memory 145. The HA 121 can store a searchable data structure that identifies the relationships between the array's LUNs, LVs, TIDs, or physical address spaces. For example, a LUN can correspond to a physical address space, while an LV can correspond to one or more LUNs. Thus, a group of LUNs can relate to an entire storage track (e.g., TID).

In embodiments, the array's RA 140 can manage communications between the array 105 and an external storage system (e.g., remote system 115) over, e.g., a second communication medium 120 using a communications protocol. In embodiments, the first medium 118 or second medium 120 can be an Explicit Congestion Notification (ECN) Enabled Ethernet network.

The array's EDS 110 can perform one or more self-optimizing techniques (e.g., one or more machine learning techniques) to deliver performance, availability, and data integrity services for the array 105 and its components 101. For example, the EDS 110 can perform a data deduplication (dedupe) technique if a write IO sequence matches a previously received write IO sequence. In addition, the EDS 110 can include an intelligent data dedupe controller (e.g., dedupe controller 305 of FIG. 3) that significantly reduces the latency associated with performing data dedupe as described in greater detail herein.

Figure 2:
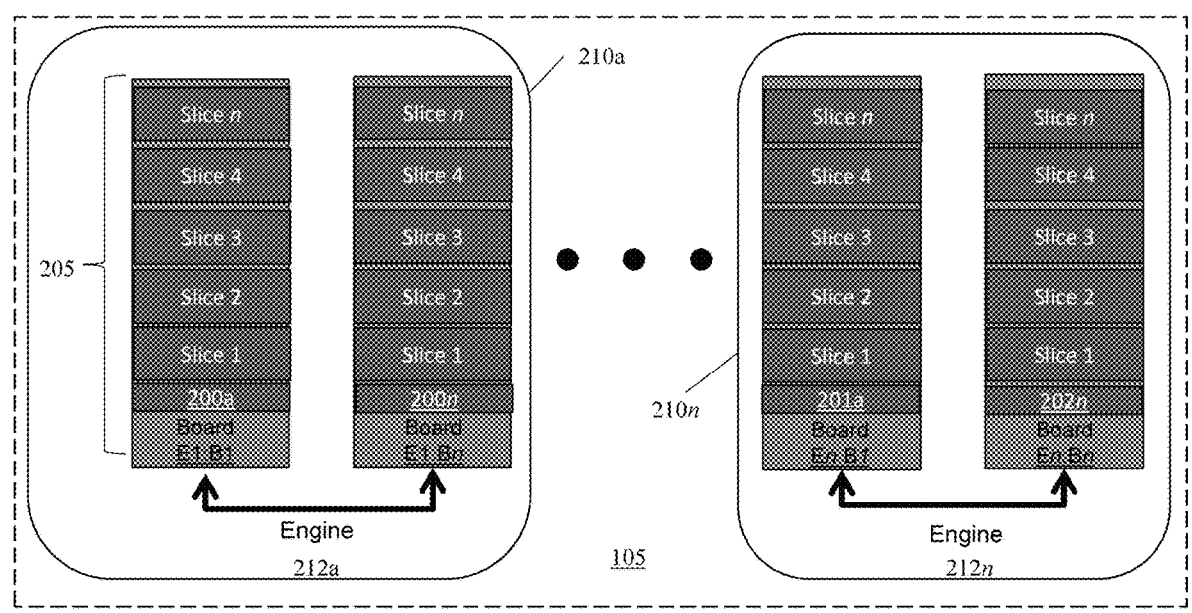
FIG. 2 is a block diagram of a storage array's director boards in accordance with embodiments of the present disclosure.

Referring to FIG. 2, the storage array 105 includes engines 212a-n that deliver storage services. Each of the engines 212a-n has hardware circuitry or software components required to perform the storage services. Additionally, the array 105 can house each engine 212a-n in one or more of its shelves (e.g., housing) 210a-n that interface with the array's cabinet or rack (not shown).

In embodiments, each engine 212a-n can include director boards (boards) E1:B1-E1:Bn, En:B1-En:Bn. The boards E1:B1-E1:Bn, En:B1-En:Bn can have slices 205, with each slice comprising hardware or software elements that perform specific storage services. Each board's slices 1-n can correspond to or emulate one or more of the storage array's components 101 described in FIG. 1. For example, each board's Slice 1 can correspond to or emulate the EDS 110. In embodiments, the slices 2-n can emulate one or more of the array's other components 101. Further, the boards B1-n can include memory 200a-n-201a-n, respectively. The memory 200a-n-201a-n can be dynamic random-access memory (DRAM).

In embodiments, each emulated EDS 110 (collectively "EDS 110") can provision its respective board with memory from the array's global memory 150. For example, the EDS 110 can uniformly carve out at least one global memory section into x-sized memory portions 200a-n-201a-n. Further, the EDS 110 can size each global memory section or the x-sized memory portions 200a-n-201a-n to store data structure filters like cuckoo filters. The EDS 110 can size each global memory section, or the x-sized portions based on an IO workload's predicted metrics related to an amount and frequency of sequential IO write patterns. For instance, the predicted metrics can define an amount of data the x-sized memory portions 200a-n-201a-n may be required to store. Further, the EDS 110 (e.g., slice 1) can store n-bits of an IO request's fingerprint in its accessible data structure filter (e.g., the data structure filter in its board's memory portion). Thus, each board's EDS 110 can use its accessible data structure filter to reduce the latency associated with performing remote board fingerprint searches, as described in greater detail herein.

Figure 3:
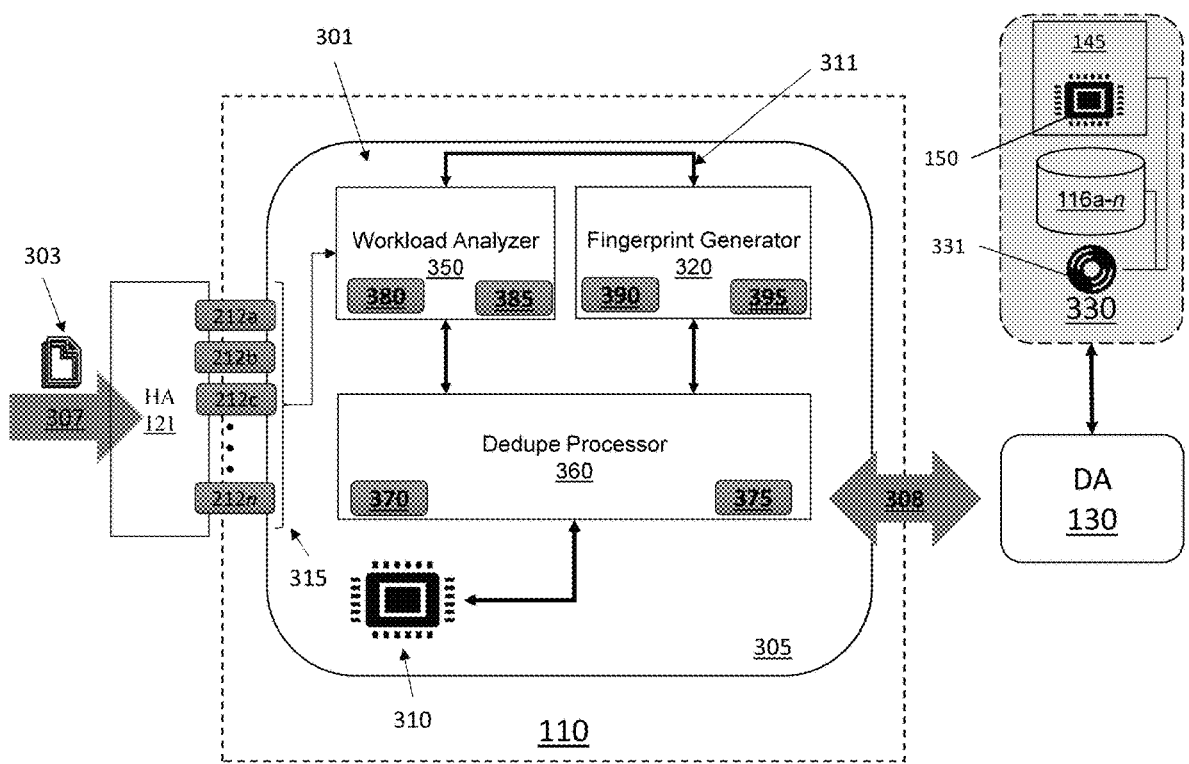
FIG. 3 is a block diagram of a dedupe controller in accordance with embodiments of the present disclosure.

Referring to FIG. 3, each board's EDS 110 can include a dedupe controller 305. The controller 305 can include one or more elements 301 (e.g., software or hardware elements) that perform at least one data dedupe operation. For example, the dedupe controller 305 and its elements 301 can identify sequential write IO patterns across multiple storage data tracks and store that information in local memory 310 (e.g., in a portion of a track identifier's (TID's) persistent memory region).

In embodiments, one or more of the dedupe controller's elements 301 can reside in one or more of the array's other components 101 or one or more of its related board's component emulations (e.g., slices 1-n). Further, the dedupe controller 305 and its elements 301 can be any commercially available processor, such as an Intel-based processor or graphical processing unit (GPU). Additionally, one or more of the dedupe controller's internal communication channels 311 can communicatively couple the elements 301. The communication channels 311 can include Fibre channels, internal busses, or communication modules.

In embodiments, the array 105 can receive an IO workload 307. The IO workload can include one or more IO requests 303 sent from one or more of the hosts 114a-n of FIG. 1. The array 105 can receive each of the IO requests 303 via an HA (e.g., HA 121 of FIG. 1) residing on or emulated by a board B1-n of one of the array's engines 212a-n. As described above in reference to FIG. 1, each HA can present the hosts 114a-n with logical representations of the array's physical storage devices 116a-n. Further, an HA can identify a port associated with the HA's related engine or the engine's board on which the HA resides. Accordingly, an IO request can include routing information such as a target logical address space (e.g., LUN) or port in, e.g., its metadata.

In embodiments, the controller 305 can analyze the workload's IO requests 303 using a workload analyzer 250 via a communications interface 315. The interface 315 can include, e.g., a Fibre Channel or NVMe (Non-Volatile Memory Express) Channel that communicatively couples the EDS 110 with the HA 121. Further, the analyzer 350 can include logic or circuitry configured to analyze the IO workload 307 and its related IO requests 303. The analysis can include identifying the workload's or one or more of the IO request's characteristics. For example, each IO request can include metadata including information associated with an IO type, data track related to the data involved with each IO, time, performance metrics, and telemetry data, and the like.

The analyzer 350 can determine that an IO write request series or set corresponds to a sequential IO write request. In first example, the analyzer 350 can check a SCSI logical block count (LBC) size of each IO request or bulk read each previous track's TID. In a second example, the processor 360 can first identify sequential write IOs (e.g., sequential write extents) by analyzing sequential track allocations, sequential zero reclaim, or sequential read IO prefetches. Second, the analyzer 350 can search cache tracks for recently executed write operations during a time threshold (e.g., over a several millisecond time window). Third, the analyzer 350 can mark bits related to the recently executed write operations related to a sequential write IO pattern. For instance, the processor 360 can mark one or more bits of a track's TID to identify an IO's relationship to a sequential write IO pattern. As such, the processor 360 can establish one of each track's TID as a sequential IO bit, and another bit as a sequential IO checked bit.

Additionally, the analyzer 350 can identify sequential IO write request patterns based on historical or current IO write sequence data. In embodiments, the analyzer 350 can include a machine learning (ML) processor 390 that includes logic or circuitry defining a neural network pattern identifier. The ML processor 390 can process the historical or current IO write sequence data through its neural network pattern identifier to identify matching IO write sequences and any corresponding temporal patterns associated with the matching IO write sequences.

Further, the analyzer 350 can dynamically monitor the array's storage resources 330, such as the array's storage devices 116a-n and memory resources 145 including the global memory 150. The storage resources 330 have storage or memory portions (e.g., slices, sectors, and the like) that can have a related address space identifier (ID). The address space ID defines its related storage resource portion's physical local in, e.g., the storage devices 116a-n or global memory 150. The analyzer 350 can monitor the resources 330 by maintaining an activity log of events related each of the storage or memory portions.

For example, the array 105 can include daemons 331 that communicatively couple to the array's storage resources 330 via, e.g., a Fibre channel 160 of FIG. 1. The daemons 331 can record their corresponding storage resources' read/write activity in their respective activity logs. Each record can include information defining IO read/write requests associated with each storage or memory portion. The information can include device characteristics such as read/write data type, data size, storage/memory slot size, read/write performance, SL requirement, and telemetry data, amongst other event-related metadata. The read/write performance can correspond to the array's response time to service each storage or memory portions related IO read/write requests.

The analyzer 350 can include a resource controller 380 that generates one or more storage resource snapshots by periodically analyzing each daemon's activity log via, e.g., a Fibre channel 308. The resource controller 380 can store the snapshots and activity logs in the local memory 310. In other embodiments, the daemons 331 can randomly or periodically issue activity log reports to the resource controller 380. For example, the resource controller 380 can generate a daemon reporting schedule that defines the duration, start time, and/or end time of each daemon's event collection period. The analyzer 350 can establish the reporting schedules based on patterns of the historical/current workloads, each workload's IO requests, and storage resources' activity levels.

Further, the analyzer 350 can determine whether the array 105 is experiencing an intensive IO workload based on the activity levels. The analyzer 350 can identify the IO workload 307 as intensive if it includes one or more periods during with the array 105 receives a large volume of IOs per second (IOPS). For any IO associated with an intensive workload, the analyzer 350 can indicate the association in the IO's metadata.

In addition, the resource controller 380 can generate a storage resources heatmap from each storage resources snapshot. Each heatmap can define each storage resource portion's read/write activity levels for a current IO workload, e.g., IO workload 307. Additionally, the resource controller 380 can identify heatmap patterns using an ML engine 385. Using the heatmaps and heatmap patterns, the resource controller 220 can generate one or more IO request classification policies.

For example, the resource controller 380 can identify the storage resource portions having the highest and lowest relative activity levels during each snapshot's related time period. The resource controller 380 can define the highest and lowest relative activity levels using the snapshot's corresponding heatmap. Thus, the resource controller 380 can define each heatmap's activity level range from the storage resource portions having the highest and lowest relative activity levels. The resource controller 380 can further define a storage activity level condition for each heatmap based on each heatmap's activity level range and heatmap patterns' ranges. For example, each storage activity level condition can define a storage activity level threshold that a request's corresponding storage resource portion's (e.g., address space's) activity level must exceed. The analyzer 350 can generate each IO request classification policy from each heatmap group. For example, a policy classifies a storage resource portion as 'hot' if its activity level exceeds the policy's activity level threshold. If a storage resource portion does not satisfy the policy's activity level condition, it classifies the resource portion as 'cold.'

In embodiments, the controller 305 can include a fingerprint generator 320 that generates a fingerprint from each IO write request. For example, the generator 320 can use one or more of the request's related logical storage identifier (e.g., LUN), physical address space, or data track metadata to generate the fingerprint. Further, the generator 320 can establish a searchable data structure (e.g., a hash table) from the fingerprints that associates the fingerprints with their respective data tracks. Additionally, the generator 320 can link related data tracks. For example, if a source Track A's fingerprint matches with target track B's fingerprint, the generator 320 can link them as similar data blocks in the hash table. Accordingly, the generator 320 can improve disk storage efficiency by eliminating a need to store multiple references to related tracks. The generator 320 can store the data structure in the local memory 310.

In addition, the generator 320 can generate the fingerprints with a data format having characteristics that facilitates efficient search operations. For example, the generator 320 can include a hash processor 390 that includes hash circuitry or logic that generates a fixed-sized or restricted-sized identifier (e.g., fingerprint) from each from each IO write request in an IO write request sequence. Thus, the fingerprint generator 320 can restrict ensure efficient search performances (e.g., speed) by restricting the fingerprints to a threshold length. However, the hash processor 390 must set the threshold lengths to have a size ensure that each distinct IO request and its related logical storage identifier (e.g., LUN), physical address space, or data track metadata generates a corresponding unique identifier. Thus, the threshold length can have a size that may not provide sufficient search efficiencies for remote board fingerprint lookups as described herein.

As discussed above in reference to FIG. 1, an SLA can define the host's expected SLO. In embodiments, a first host (e.g., host 114a) can have a distinct SLO from a second host (e.g., one or more of the hosts 114n). Accordingly, the first host can issue a first IO write sequence request directed to one of the array's ports that is distinct from the port the second host issued a second IO write sequence request. Thus, the array 105 can store the first and second IO write sequence request's corresponding fingerprints on two distinct board's memory (e.g., on memory 200a and memory 201a).

For example, the first host can send a sequence of IO write requests (e.g., sequence 303) to the array 105. The requests 303 can correspond to an email and its attachments requiring one or more portions of the array's storage resources (e.g., disks 116a-n or memory 150). The array 105 can receive the IO write requests via a first director board E1:B1 on first engine 212a. However, array 105 can have received a previous IO write sequence request via a second director board En:B1 to store the email and its attachments from the second host. Accordingly, the first board's memory 200a may not include a reference to the fingerprint related to the email and its attachments. As such, the first board E1:B1 performs a remote board fingerprint search to retrieve the fingerprint if it exists (i.e., the first board E1:B1 does not know if a fingerprint related to the email and its contents exists). As stated herein, this remote board fingerprint search can introduce unacceptable latencies (e.g., a latency that results in array IO request response times that do not satisfy the SLA or SLO).

Thus, the fingerprint generator 320 can further include a fingerprint compressor 395 that compresses each fingerprint.

The fingerprint compressor 395 can establish a hints data structure that includes compressed fingerprint records and is accessible by any of the array's director boards E1:B1-En: Bn. To conserve memory resources, the fingerprint compressor 395 can establish the hints data structure filter to have space-efficient attributes like the space-efficient attributes of a Cuckoo filter. Further, the fingerprint compressor 395 can configure the hints data structure to indicate if its related board is storing a requested fingerprint. Accordingly, the fingerprint compressor 395 can compress a fingerprint by parsing and recording n-bits of the fingerprint in the hints data structure. As such, the embodiments disclosed herein reduce the latency associated with remote board fingerprint searches associated with relatively higher response expenses associated with a fabric finger search request that returns an async miss response. Further, the fingerprint compressor 395 can select a set and length (i.e., size) of each fingerprint's n-bits to identify a board on which the fingerprint and its related compressed fingerprint should be stored. For example, the fingerprint compressor 395 set and length of the n-bits based on the number of the array's engines 212a-n or the aggregate number of the engines' boards E1:B1-En-Bn.

In embodiments, the fingerprint compressor 395 can further limit a number of records held by the hints data structure filter to conserve the array's global memory resources 150 of FIG. 1. For example, the fingerprint compressor 395 can receive one or more of the heatmaps from the analyzer 350. Using the heatmaps, the analyzer 350 can limit the records to those associated compressed fingerprints related to hot data tracks. Thus, the fingerprint compressor 395 can update the hints data structure filter in response to a change in activity levels of the data tracks by removing compressed fingerprints related to data tracks that have transitioned from 'hot' to 'cold', and add compressed fingerprints related to data tracks that have transitioned from 'cold' to 'hot'. Further, the fingerprint compressor 395 can limit the compressed fingerprint records stored by the hints data structure filter to those corresponding to the N most active 'hot' data tracks.

In embodiments, the EDS 110 can also include a dedupe processor 360 that dedupes data related to IO write sequences that match a previously received IO write sequences data. For example, the dedupe processor 360 residing on, e.g., first board such as the board E1:B1 can an indication from the analyzer 350 that a current IO write sequence request matches a previously received IO write sequence request. In response to receiving the indication, the processor 360 can perform a local fingerprint search determine if the board's is storing the IO write sequence's fingerprint in the board's memory 200a. For example, the processor 360 can perform a search of the hints data structure filter stored locally in the memory 200a.

If the local hints data structure filter returns a hit, the processor 360 performs a search of the local hash fingerprint data structure. In response to receiving a hit response, the processor 360 can issue a request to the analyzer 350 to identify the activity level of the data track(s) related to the IO sequence's fingerprints. If the activity levels satisfy a destage activity level threshold, the processor 360 using its destage processor 370 that destages the IO write sequence requests and its related data directly to the array's storage memory or storage resources 330. Otherwise, the processor 360 can initiate a dedupe thread 375 to dedupe the IO write sequence request's related data.

If the local hints data structure filter returns a miss, the processor 360 can perform a remote fingerprint search by issues a search request to each of the array's other director boards. In other embodiments, the processor 360 can access a remote board search engine 375 that can use the n-bits of each fingerprint to identify the board on which the compressed fingerprint should be stored. For example, the remote board search engine 375 can include logic that can identify a set and length (i.e., size) of each fingerprint's n-bits to identify a board on which the fingerprint and its related compressed fingerprint should be stored. If the remote board returns a hit, the processor 360 can send the IO write sequence request to the remote board. The remote board can then perform a local fingerprint search and dedupe the sequences related data or destage the sequence and its related data to the array's storage resources 330 as described above.

Further, the processor 360 can pause data deduplication operations based on a state of the array 105. For example, the processor 360 can perform an array performance check in response to receiving an IO associated with an intensive IO workload. If the array performance check indicates that the array 105 is not meeting at least one performance expectation of one or more of the hosts 114a-n, the processor 360 can halt dedupe operations. In other examples, the processor 360 can proceed with performing dedupe operations if an IO is not associated with an intensive workload or the array meets performance expectations and can continue to do so should the processor 360 continue to perform dedupe operations.

The following text includes details of one or more methods or flows diagrams in accordance with this disclosure. For simplicity of explanation, the methods are depicted and described as a series of acts. However, acts in accordance with this disclosure can occur in various orders or concurrently and with other acts not presented and described herein. Furthermore, not all illustrated acts may be required to implement the methods per the disclosed subject matter.

Figure 4:
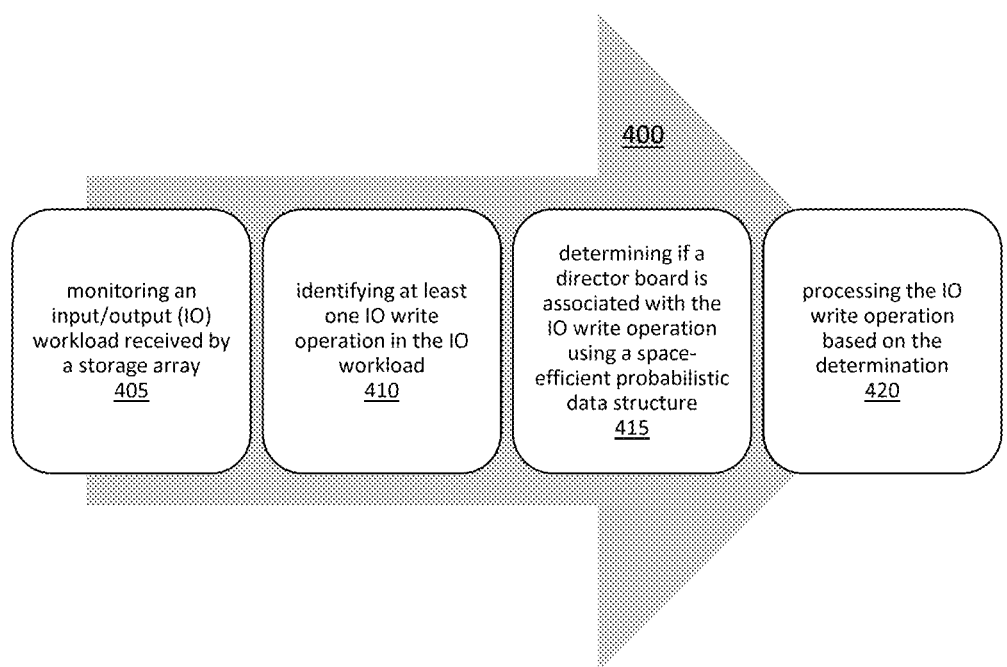
FIG. 4 is a flow diagram of a method for reducing data deduplication latency in accordance with embodiments of the present disclosure.

Regarding FIG. 4, a method 400 can be executed by any array component (e.g., components 101 of FIG. 1). The method 400 describes a process for reducing data deduplication latency. At 405, the method 400 can include monitoring an input/output (IO) workload received by a storage array. The method 400, at 410, can also include identifying at least one IO write operation in the IO workload. At 415, the method 400 can further include determining if a director board is associated with the IO write operation using a space-efficient probabilistic data structure. The method 400, at 420, can also include processing the IO write operation based on the determination. It should be noted that each step of the method 400 can include any combination of techniques implemented by the embodiments described herein.

Using the teachings disclosed herein, a skilled artisan can implement the above-described systems and methods in digital electronic circuitry, computer hardware, firmware, or software. The implementation can be as a computer program product. The implementation can, for example, be in a machine-readable storage device for execution by or to control the operation of, data processing apparatus. The implementation can, for example, be a programmable processor, a computer, or multiple computers.

A computer program can be in any programming language, including compiled or interpreted languages. The computer program can have any deployed form, including a stand-alone program or subroutine, element, or other units suitable for a computing environment. One or more computers can execute a deployed computer program.

One or more programmable processors can perform the method steps by executing a computer program to perform functions of the concepts described herein by operating on input data and generating output. An apparatus can also perform the method steps. The apparatus can be a special purpose logic circuitry. For example, the circuitry is an FPGA (field-programmable gate array) or an ASIC (application-specific integrated circuit). Subroutines and software agents can refer to portions of the computer program, the processor, the special circuitry, software, or hardware that implement that functionality.

Processors suitable for executing a computer program include, by way of example, both general and special purpose microprocessors and any one or more processors of any digital computer. Generally, a processor receives instructions and data from a read-only memory, a random-access memory, or both. Thus, a computer's essential elements can include a processor that executes instructions that the computer's one or more memory devices store. Generally, a computer can include, can be operatively coupled to receive data from or transfer data to one or more mass storage devices for storing data (e.g., magnetic, magneto-optical disks, or optical disks).

Data transmission and instructions can also occur over a communications network. Information carriers suitable for embodying computer program instructions and data include all nonvolatile memory forms, including semiconductor memory devices. The information carriers can, for example, be EPROM, EEPROM, flash memory devices, magnetic disks, internal hard disks, removable disks, magneto-optical disks, CD-ROM, or DVD-ROM disks. In addition, the processor and the memory can be supplemented by or incorporated in special purpose logic circuitry.

A computer having a display device that enables user interaction can implement the above-described techniques. The display device can, for example, be a cathode ray tube (CRT) or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). In addition, other kinds of devices can provide for interaction with a user. Other devices can, for example, be feedback provided to the user in any form of sensory feedback (e.g., visual feedback, auditory feedback, or tactile feedback). Input from the user can, for example, be in any form, including acoustic, speech, or tactile input.

A distributed computing system that includes a back-end component can also implement the above-described techniques. The back-end component can, for example, be a data server, a middleware component, or an application server. Further, a distributing computing system that includes a front-end component can implement the above-described techniques. The front-end component can, for example, be a client computer having a graphical user interface, a Web browser through which a user can interact with an example implementation, or other graphical user interfaces for a transmitting device. Finally, the system's components can interconnect using any form or medium of digital data communication (e.g., a communication network). Examples of communication networks include a local area network (LAN), a wide area network (WAN), the Internet, wired networks, or wireless networks.

The system can include clients and servers. A client and a server are generally remote from each other and typically interact through a communication network. A client and server relationship can arise by computer programs running on the respective computers and having a client-server relationship.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 networks, 802.16 networks, general packet radio service (GPRS) network, HiperLAN), or other packet-based networks. Circuit-based networks can include, for example, a public switched telephone network (PSTN), a private branch exchange (PBX), a wireless network, or other circuit-based networks. Finally, wireless networks can include RAN, Bluetooth, code-division multiple access (CDMA) network, time division multiple access (TDMA) network, and global system for mobile communications (GSM) network.

The transmitting device can include, for example, a computer, a computer with a browser device, a telephone, an IP phone, a mobile device (e.g., cellular phone, personal digital assistant (P.D.A.) device, laptop computer, electronic mail device), or other communication devices. The browser device includes, for example, a computer (e.g., desktop computer, laptop computer) with a world wide web browser (e.g., Microsoft® Internet Explorer® and Mozilla®). The mobile computing device includes, for example, a Blackberry®.

The terms "comprise," "include," and "or" are open-ended, include the listed parts, and contain additional elements that are not listed. Additionally, the term "or" is open-ended and includes one or more of the listed parts and combinations of the listed features.

One skilled in the art will realize that other specific forms can embody the concepts described herein without departing from their spirit or essential characteristics. Therefore, the preceding embodiments are, in all respects, illustrative rather than limiting the concepts described herein. The appended claims thus recite the scope of this disclosure. Therefore, all changes embrace the meaning and range of equivalency of the claims.

What is claimed is:

1. A method comprising:
    monitoring an input/output (TO) workload received by a storage array;
    identifying at least one IO write operation in the IO workload;
    generating a unique fingerprint identifier for the IO write operation;
    selecting a set of n-bits of the unique fingerprint to store in a space-efficient probabilistic data structure, wherein the space-efficient probabilistic data structure includes a cuckoo filter;
    determining a director board is associated with the IO write operation using the space-efficient probabilistic data structure, wherein the unique fingerprint is generated such that the set of n-bits of the unique fingerprint identify one of the storage array's director boards associated with the unique fingerprint's related IO write operation; and
    processing the IO write operation based on the determination.

2. The method of claim 1, further comprising receiving the IO write operation by a first director board.

3. The method of claim 2, wherein determining if the director board is associated with the IO write operation, includes:
    determining if the first director board or a second director board remote from the first director board is related to the IO write operation, wherein the storage array houses the first and second director board.

4. The method of claim 1, further comprising:
pre-allocating a portion of the storage array's global memory for each of the storage array's director boards; and
configuring each director board's pre-allocated global memory portion to store the space-efficient probabilistic data structure.

5. The method of claim 4, wherein pre-allocating each director board's global memory portion, includes uniformly provisioning a global memory section for each director board.

6. The method of claim 1, further comprising:
generating the unique fingerprint using hash processing.

7. The method of claim 1, further comprising:
maintaining a copy of the space-efficient probabilistic data structure on each of the storage array's director boards.

8. The method of claim 7, wherein maintaining the copy of the space-efficient probabilistic data structure, includes:
periodically identifying one or more fingerprints generated during a prior time window; and
updating each copy of the space-efficient probabilistic data structure with each generated fingerprint's set of n-bits.

9. An apparatus comprising a memory and processor configured to:
monitor an input/output (TO) workload received by a storage array;
identify at least one IO write operation in the IO workload;
generate a unique fingerprint identifier for the IO write operation;
select a set of n-bits of the unique fingerprint to store in a space-efficient probabilistic data structure, wherein the space-efficient probabilistic data structure includes a cuckoo filter;
determine a director board is associated with the IO write operation using the space-efficient probabilistic data structure, wherein the unique fingerprint is generated such that the set of n-bits of the unique fingerprint identify one of the storage array's director boards associated with the unique fingerprint's related IO write operation; and
process the IO write operation based on the determination.

10. The apparatus of claim 9, further configured to receive the IO write operation by a first director board.

11. The apparatus of claim 10, further configured to:
determine if the first director board or a second director board remote from the first director board is associated with the IO write operation, wherein the storage array houses the first and second director board.

12. The apparatus of claim 9, further configured to:
pre-allocate a portion of the storage array's global memory for each of the storage array's director boards; and
configure each director board's pre-allocated global memory portion to store the space-efficient probabilistic data structure.

13. The apparatus of claim 12, further configured to uniformly provision a global memory section of each director board's pre-allocated global memory portion for each director board.

14. The apparatus of claim 9, further configured to:
generate the unique fingerprint using hash processing.

15. The apparatus of claim 9, further configured to:
maintain a copy of the space-efficient probabilistic data structure on each of the storage array's director boards.

16. The apparatus of claim 15, further configured to:
periodically identify one or more fingerprints generated during a prior time window; and
update each copy of the space-efficient probabilistic data structure with each generated fingerprint's set of n-bits.

* * * * *